United States Patent [19]
Imaizumi

[11] 3,918,858
[45] Nov. 11, 1975

[54] OIL SEAL ARRANGEMENT FOR A ROTARY ENGINE

[75] Inventor: Kenichi Imaizumi, Aichi, Japan

[73] Assignee: Toyota Jidosha Kogyo Kabushiki Kaisha, Aichi, Japan

[22] Filed: May 31, 1974

[21] Appl. No.: 475,188

[30] Foreign Application Priority Data
June 2, 1973 Japan................................ 48-64498
Apr. 19, 1974 Japan............................... 49-43637

[52] U.S. Cl.................................. 418/142; 277/65
[51] Int. Cl.² ................ F01C 19/00; F04C 27/00; F16J 15/16
[58] Field of Search .......... 418/142; 277/58, 65, 82; 123/8.01

[56] References Cited
UNITED STATES PATENTS

| | | | |
|---|---|---|---|
| 2,943,453 | 7/1960 | Jonkers et al.............. | 277/65 |
| 3,134,600 | 5/1964 | Fisch........................ | 418/142 |
| 3,171,590 | 3/1965 | Bentele et al............. | 418/142 |
| 3,300,127 | 1/1967 | Yamamoto et al......... | 418/142 |
| 3,669,458 | 6/1972 | Witzenburg................ | 277/82 |
| 3,782,869 | 1/1974 | Steinwart et al........... | 418/142 |
| 3,784,337 | 1/1974 | Sebring et al............. | 418/142 |

*Primary Examiner*—John J. Vrablik
*Attorney, Agent, or Firm*—Toren, McGeady and Stanger

[57] ABSTRACT

In a rotary engine, an oil seal arrangement is provided between the side surfaces of the rotor and the inwardly facing surfaces of the housing. A first annular groove and a second annular groove are formed in the side surfaces of the rotor encircling its axis of rotation. The grooves are contiguous one opening into the other. The grooves are formed inwardly of a side seal between the rotor and the housing. A seal ring is fitted into the first annular groove and is biased into contact with the housing surface by a spring. An oil seal of U-shaped cross sectional configuration is fitted into the second annular groove so that one of its legs or lips is firmly pressed against the seal ring in the first annular groove under the force of a coil spring or ring. With this arrangement, leakage of the lubricant for the drive shaft into the combustion chamber can be prevented with the lubricant being scraped by the seal ring into the side seals of the rotor. When the second annular groove is formed inwardly of the first annular groove relative to the side seal, there is the advantage that the leg or lip of the U-shape oil seal can be more firmly pressed against the seal ring under the centrifugal force generated upon the rotation of the rotor whereby a more positive oil-tight seal is achieved.

15 Claims, 9 Drawing Figures

OIL SEAL ARRANGEMENT FOR A ROTARY ENGINE

BACKGROUND OF THE INVENTION

1. Field of the Invention

The present invention relates to a rotary engine and, more particularly, to an oil seal assembly or arrangement disposed between the side surfaces of a rotor and the rotary engine housing for preventing the lubricant for the drive shaft from leaking into the combustion chamber.

2. Description of the Prior Art

In general, the side oil seal arrangement for a triangular rotor in a rotary engine is such that an O-ring is interposed between a seal ring fitted into an annular groove formed in the side surface of the rotor and the bottom of another annular groove formed in the rotor or in the seal ring for receiving the O-ring to afford the required oil-tightness. When the annular groove for the O-ring is formed in the seal ring, the seal ring has a complex cross-sectional configuration resulting in a thin wall thickness and tends to be easily deformed during fabrication and handling. When the annular groove for the O-ring is formed within the annular groove for the seal ring, the deformation of the seal ring may be prevented because it is solid. However, machining an additional annular groove within the annular groove for a seal ring in a triangular rotor is extremely difficult, time-consuming and expensive.

SUMMARY OF THE INVENTION

In view of the problems experienced in the prior art, one of the primary objects of the present invention is to provide an oil seal arrangement for a rotary engine which uses solid seal rings so that the fabrication involved can be considerably facilitated at less cost, and deformation can be prevented during assembly and handling.

Briefly stated, in accordance with the present invention, a solid seal ring is fitted into a first annular groove which is formed in the side surfaces of a rotor encircling its axis, and the seal ring is pressed against the interior surface of the side housing of the engine under the force of a spring positioned between the bottom of the seal ring and the bottom of its annular groove. In addition, an oil seal of U-shaped cross sectional configuration is fitted into the second annular groove formed in the side surfaces of the rotor, which groove is contiguous to the first annular groove, that is, the two annular grooves open into one another. The seal arrangement is formed inwardly of a side seal extending between the side surface of the rotor and the inner surface of the housing and the second annular groove is positioned either inwardly or outwardly of the first annular groove relative to the side seal. The U-shaped oil seal is positioned within the second annular groove so that one of its legs or lips is firmly pressed against the seal ring in the first annular groove because of its own elastic force and/or under the biasing action of a coiled spring or ring. When the second annular groove is formed inwardly of the first annular groove, there is the advantage that the leg of the U-shaped oil seal contacting the seal ring is pressed more firmly against it under the centrifugal force developed by the rotation of the rotor whereby a more positive oil-tightness is established.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
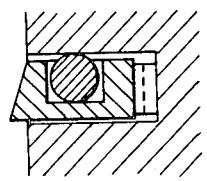
FIGS. 1 and 2 are sectional views of prior art oil arrangements used in rotary engines.
Figure 2:
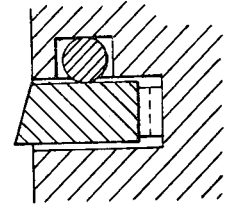

Prior Art, FIGS. 1 and 2

In FIGS. 1 and 2, two examples of prior art oil seal arrangements for use in rotary engines are shown within the side surfaces of a rotor. In FIG. 1, an O-ring is fitted into an annular groove formed in a seal ring set in an annular groove in the side surface of the rotor. In this arrangement the formation of the seal ring is very complex in its cross sectional shape and, further, due to the annular groove a portion of the seal ring has a very thin wall thickness. In such an arrangement the seal ring is easily susceptible to deformation during fabrication, handling and assembly. In FIG. 2, an annular groove for the O-ring is formed in one side of the annular groove containing the seal ring, however, the annular groove is formed radially inwardly from the side surface of the rotor and, as a result, the machining operation for forming the groove for the O-ring is very complex, time-consuming and expensive.

Figure 3:
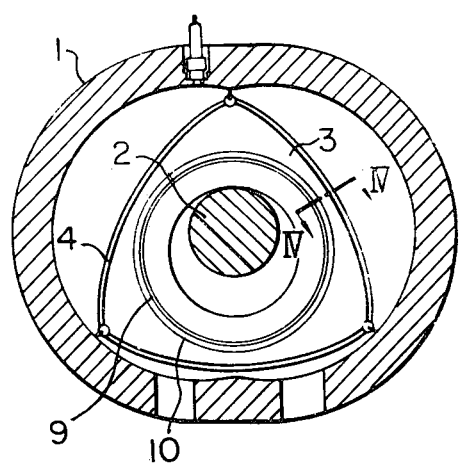
FIG. 3 is a schematic sectional view of a rotary engine illustrating a first embodiment of an oil seal arrangement in accordance with the present invention.
Figure 4:
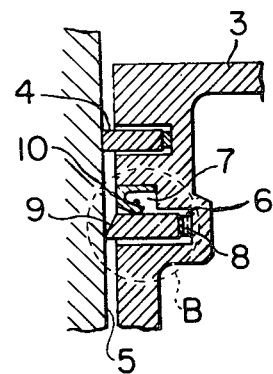
FIG. 4 is a sectional view taken along the line IV—IV in FIG. 3.
Figure 5:
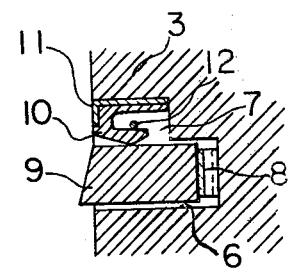
FIG. 5 is an enlarged detail view of the portion of FIG. 4 encircled by a broken line.

First Embodiment, FIGS. 3–5

In FIGS. 3–5, side seals 4 are positioned in the side surfaces of a triangular rotor 3 mounted on a drive shaft 2 and are pressed against the inside walls of an epitrochoidal chamber in the housing 1 of a rotary engine so that an airtight arrangement is provided between the inside surfaces of the housing members 5 and the side surfaces of the rotor 3. As shown in FIG. 4, each side surface of the rotor 3 has a first annular groove 6 containing a seal ring 9 and a second annular groove containing a U-shaped annular oil seal 10. In the arrangement of FIGS. 3–5, the second annular groove is located closer to the side seal 4 than the first annular groove, note FIG. 4. Further, the depth of the second annular groove 7 into the side surface of the rotor is less than the first annular groove. The annular grooves extend about the side surfaces of the rotor encircling its axis.

Annular seal ring 9 is slidably fitted into the annular groove and it is normally biased outwardly toward the inside surface of the side housing member 5 by a spring 8 located at and fitted between the base of the annular groove 6 and the inner surface of the seal ring 9. This arrangement assures oil-tight contact between the inner surface of the side housing member 5 and the rotor 3, so that the lubricant for the drive shaft 2 is prevented from leaking into the combustion chamber defined between the rotor 3 and the housing. The annular seal ring 9 has a width which is less than the width of the annular groove 6 and its side which contacts the inside surface of the housing member 5 has a tapered or sloping surface.

In the second annular groove 7, the U-shaped annular oil seal 10 has its opening facing inwardly into the groove with one of its legs contacting the radially extending side surface of the groove and its other leg being pressed against the adjacent radially extending side wall of the seal ring 9, note FIG. 5. Further, as shown in FIG. 5, an annular reinforcing member 11 of L-shaped cross sectional configuration is attached to the surface of the oil seal leg facing toward the radially extending side of the second annular groove. As can be seen in FIG. 5, the reinforcing member 11 extends along the full length of one leg of the oil seal 10 and then is in contact with the radially outer surface of the portion of the oil seal forming its bight that is, the surface of the oil seal facing toward the inside surface of the side housing member 5. The opposite leg or lip of the oil seal 10 is firmly pressed against the adjacent side surface of the seal ring 9 due to its elasticity and also under the force of a coiled spring 12. In place of a coiled spring a ring member can provide the same effect. Therefore, an air-tight contact is provided between the seal ring 9 and the oil seal 10. The oil seal 10, when having sufficient resilience may dispense with the spring 12.

When the rotary engine is in use, the oil seal arrangement operates in the following manner. Upon rotation of the rotor 3, the lubricant in the space between the side surface of the rotor and the inner surface of the side housing member 5 is scraped by the seal ring which is pressed against the inner surface of the side housing member by the force of the spring 8. A part of the scraped lubricant flows into the space between the annular groove and the seal ring, however, it is prevented from flowing toward the side seal elements 4 because the airtightness between the seal ring 9 and its annular groove 6 is maintained by the oil seal 10.

Figure 6:
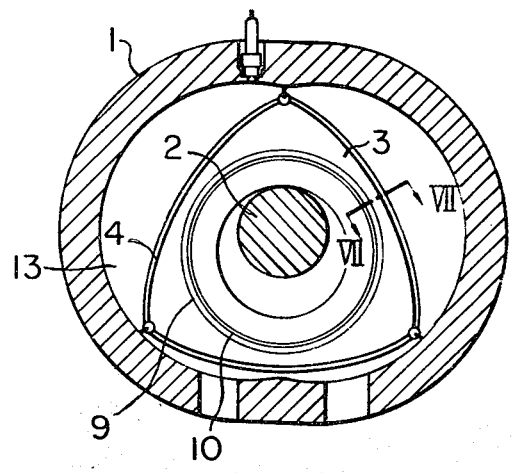
FIG. 6 is a schematic sectional view, similar to FIG. 3, of a rotary engine illustrating a second embodiment of the present invention.
Figure 7:
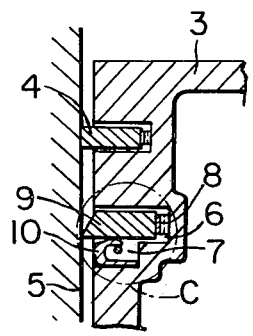
FIG. 7 is a sectional view taken along the line VII—VII of FIG. 6.
Figure 8:
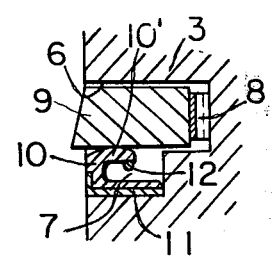
FIG. 8 is an enlarged detail view of the portion of FIG. 7 encircled by a broken-line C.

Second Embodiment, FIGS. 6–8

As shown in FIGS. 6 and 7, the second embodiment of the invention is substantially the same in construction and arrangement as the first embodiment illustrated in FIGS. 3–5, except that the second annular groove 7 in which the oil seal 10 is seated is located inwardly of the first annular groove 6 relative to the location of the side seal element 4. As in the first embodiment, the two annular grooves are formed contiguously in side-by-side relationship so that one opens into the other. As can be seen in FIGS. 7 and 8, the leg or lip of the U-shaped oil seal 10 adjacent the seal ring 9 is forced to contact with the surface of the seal ring by means of the ring 12.

Figure 9:
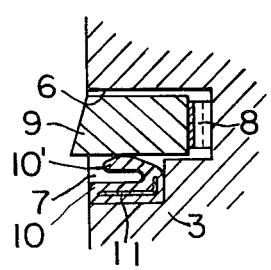
FIG. 9 is a partical sectional view of a third embodiment of the present invention.

Third Embodiment, FIG. 9

As shown in FIG. 9, the third embodiment of the invention is substantially the same in construction and arrangement as the second embodiment described above except that the opening in the U-shaped oil ring 10 is directed outwardly toward the side housing member, not shown. In the first two embodiments the bight portion of the U-shaped oil seal is located at the opening to the annular groove in the side surface of the rotor, however, in FIG. 9 the bight portion of the oil seal is seated against the bottom or base of the second annular groove 7. Another distinguishing feature of the third embodiment is the position of the reinforcing member 11 embedded within the leg of the oil seal 10 which is in direct contact with the side wall of the second annular groove. As can be seen in FIG. 9, the reinforcing member 11 is L-shaped but is located within the interior of the leg of the oil seal spaced inwardly from its surfaces.

The second and third embodiments of the present invention have a distinct advantage over the first embodiment because the leg or lip 10', note FIG. 9, of the U-shaped oil seal which contacts the seal ring 9 is more firmly pressed against the seal ring under the centrifugal force developed by rotation of the rotor so that a more positive and reliable oil-tightness can be secured.

As described above, in accordance with the present invention, the oil seal has a U-shaped cross sectional configuration and is located either inwardly or outwardly of the seal ring relative to the position of the side seal 4. In both of the inwardly and outwardly disposed arrangements shown in the drawings, the leg or lip 10' of the oil seal 10 is firmly pressed against the seal ring. Accordingly, complete oil-tightness between the seal ring and the annular groove can be maintained. Unlike the prior art oil seal arrangements, complex machining of an additional oil seal groove in the seal ring or in the seal ring groove can be eliminated. In the present invention, the annular grooves which receive the seal ring and the oil seal can be formed simultaneously by a formed cutter. Accordingly, solid seal rings can be used so that the fabrication of such rings is especially faciliated and deformation of the rings during handling and assembly can be prevented.

What is claimed is:

1. An oil seal arrangement for a rotary engine comprising a rotor having side surfaces facing the side surfaces of a housing member, a first annular groove formed in the side surfaces of said rotor encircling the axis of said rotor, a second annular groove formed in the side surfaces of said rotor and encircling the axis of said rotor, said first and second annular grooves being contiguous and opening laterally one into the other, a seal ring positioned in said first annular groove and arranged to project outwardly therefrom for contact with the side surfaces of the housing member, an oil seal having a U-shaped cross sectional configuration fitted into said second annular groove and disposed in spaced relationship to the side surface of said housing member, said U-shaped oil seal having a first leg and a second leg extending in the direction of said annular groove into the side surface of said rotor, said first leg being supported against the wall of said second groove spaced from said first annular groove and said second leg extending from said second groove into said first groove in the direction transversely of the depth of said second groove into said rotor and being biased against said oil seal ring so that the oil-tightness between said first annular groove and said seal ring can be maintained, the surface of said second leg facing toward said oil seal being located intermediate the inner and outer ends of said second leg with the remaining portions of the surface facing toward said oil seal being spaced therefrom.

2. An oil seal arrangement, as set forth in claim 1, wherein said U-shaped oil seal has the opening defined between the legs thereof directed inwardly toward the bottom of said second annular groove.

3. An oil seal arrangement, as set forth in claim 1, wherein said U-shaped oil seal has the opening defined between the legs thereof facing outwardly away from the base of said second annular groove.

4. An oil seal arrangement, as set forth in claim 1, wherein said seal ring has a width less than the width of said first annular groove and extends outwardly from said first annular groove for contacting the inner surface of the housing member.

5. An oil seal arrangement, as set forth in claim 1, wherein spring means are arranged in the base of said first annular groove extending between the base thereof and the inner end of said seal ring for biasing said seal ring outwardly for contacting the side surface of the housing member.

6. An oil seal arrangement, as set forth in claim 1, wherein a side seal is positioned within the side surface of said rotor spaced from said seal ring and said oil seal and extends into contact with the juxtaposed side surface of said housing member, and said first annular groove being located closer to said side seal than said second annular groove.

7. An oil seal arrangement, as set forth in claim 1, wherein a side seal is positioned within the side surface of said rotor spaced from said seal ring and said oil seal and extends into contact with the juxtaposed side surface of said housing member, and said second groove being located closer to said side seal than said first groove.

8. An oil seal arrangement, as set forth in claim 1, wherein said first annular groove having a greater depth into the side surface of said rotor than said second annular groove so that the base surface of said first annular groove is located inwardly of the base surface of said second annular groove.

9. An oil seal arrangement, as set forth in claim 1, wherein said seal ring is a solid member of uniform thickness from the base of said first annular groove to the opposite surface arranged to contact the side surface of said housing member.

10. An oil seal arrangement, as set forth in claim 1, wherein said first leg of said U-shaped oil seal includes a reinforcing member.

11. An oil seal arrangement, as set forth in claim 10, wherein said reinforcing member comprises an L-shaped member disposed in surface contact with the outer surface of said first leg with which it is associated and positioned between the first leg and the wall of said second annular groove contacted by said first leg.

12. An oil seal arrangement, as set forth in claim 10, wherein said reinforcing member is located interiorly within the first leg of said oil seal which is supported against the wall of said second annular groove.

13. An oil seal arrangement, as set forth in claim 1, wherein spring means are associated with said second leg of said U-shaped oil seal disposed in contact with said seal ring for biasing said leg into contact with said seal ring.

14. An oil seal arrangement, as set forth in claim 13, wherein said biasing means is a coiled spring.

15. An oil seal arrangement, as set forth in claim 13, wherein said biasing means is a ring.

* * * * *